United States Patent [19]

Dillmann et al.

[11] Patent Number: 4,925,623
[45] Date of Patent: May 15, 1990

[54] CLAMPING ARRANGEMENT FOR STAINLESS STEEL FIBER FILTER ELEMENTS

[75] Inventors: Hans-Georg Dillmann, Eggenstein-Leopoldshafen; Horst Pasler, Hochstetten; Hans Martinsteg, Roetgen, all of Fed. Rep. of Germany

[73] Assignee: Kernforschungszentrum Karlsruhe GmbH, Karlsruhe, Fed. Rep. of Germany

[21] Appl. No.: 214,123

[22] Filed: Jun. 30, 1988

[30] Foreign Application Priority Data

Jul. 18, 1987 [DE] Fed. Rep. of Germany ....... 3723888

[51] Int. Cl.$^5$ .............................................. G21C 9/00
[52] U.S. Cl. ..................................... 376/314; 55/501; 55/511; 248/231.6; 248/316.6
[58] Field of Search ............... 376/203, 204, 313, 314, 376/315, 463; 55/501, 511; 248/316.6, 500, 231.6, 228

[56] References Cited

U.S. PATENT DOCUMENTS

| 2,980,204 | 4/1961 | Jordan | 55/501 |
| 3,961,920 | 6/1976 | Gilbert | 376/314 |
| 4,193,844 | 3/1980 | Neumann et al. | 376/314 |
| 4,865,803 | 9/1989 | Dillmann et al. | 376/314 |

Primary Examiner—Daniel Wasil

[57] ABSTRACT

A clamping arrangement for stainless steel fiber filter elements in the pressure relief channel of a safety containment of a nuclear installation. The filter elements are engaged at their edges by a clamping structure which is fully disposed within the duct walls defining the relief channel. The clamping arrangement includes a support frame mounted on the duct walls and a clamping frame disposed on the support frame and clamped thereto with the edges of the respective filter element clamped therebetween such that any leakage through the clamping arrangement is still contained by the duct walls.

3 Claims, 1 Drawing Sheet

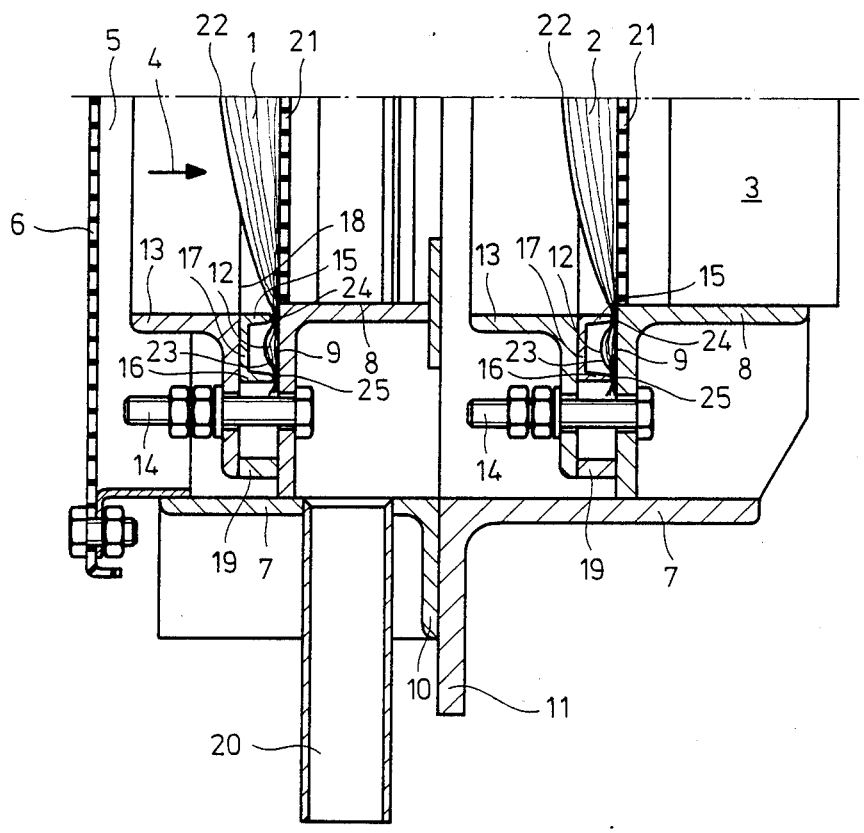

CLAMPING ARRANGEMENT FOR STAINLESS STEEL FIBER FILTER ELEMENTS

BACKGROUND OF THE INVENTION

The present invention relates to a clamping arrangement for filter elements consisting of elements or mats of stainless steel fibers utilized especially as temperature-resistant filter stages in the ducts of pressure relief systems of safety containments nuclear power plants.

The ducts of such pressure relief systems include, among other structures, water droplet separators and a number of filter stages which are capable of withstanding high temperatures and which have a high separation efficiency, which are further simple in design and capable of withstanding certain given pressures. For this purpose stainless steel fiber elements consisting of one or a plurality of stainless steel mates disposed in series are utilized which are mounted at their edges. For good support, appropriate mounting along the edges of such mats is essential.

The arrangement of stainless steel filtering structures in the ducts of safety containment is disclosed in U.S. Pat. No. 4,865,803 also assigned to the assignee of the present application and the content of this U.S. application is incorporated, by reference, in the present specification.

It is the principal object of the present invention to provide a mounting or clamping arrangement for the stainless steel fiber filter elements wherein any leakage flow even along the edges of the filter elements will be contained within the duct.

SUMMARY OF THE INVENTION

A clamping arrangement for stainless steel fiber filter elements in the pressure relief channel of a safety containment of a nuclear installation includes a clamping structure which engages the edges of the filter elements and which is fully disposed within the duct walls defining the pressure relief channel. The clamping structure includes a collar mounted on the duct walls and a clamping frame disposed on the collar with the edges of the filter element clamped therebetween such that the duct walls around the clamping structure contain any leakage through the clamped edges of the filler element.

Preferably a perforated support plate is welded to the collar and the stainless steel filter element is disposed on the perforated support plate which serves as a back-up against the forces exerted by the gas flowing through the filter element and also preferably a stainless steel wire lattice structure curved so as to follow the surface shape of the clamped-in filter element is disposed on top of the filter element and has its edges also clamped under the clamping frame so as to retain and protect the stainless steel filter element on the perforated support plate.

SHORT DESCRIPTION OF THE DRAWINGS

The single FIGURE shows the support of two filter stages 1 and 2 at the entrance end of a pressure relief channel 3 for the safety containment of a nuclear installation.

DESCRIPTION OF THE PREFERRED EMBODIMENT

A pressure relief channel 3 has an inlet opening 5 which is covered by a perforated plate 6 through which gases enter the relief channel in the direction of arrow 4.

The channel 3 is formed by duct walls 7 which have on the inside thereof annular angle iron frames 8 welded thereto providing for collars projecting radially inwardly into the channel 3 each having an upstream side 9 facing toward the flow of gas entering in the direction of arrow 4. These collars of the frames 8 serve as support surfaces for the metal fiber elements 1 and 2. The arrangement as shown in the figure includes two metal fiber elements with identical clamping arrangements. The components 8, 9, 12, 13, 16, 17 and 14 are therefore shown twice in the same manner. It is however important to note that the clamping structures are disposed completely within the duct walls 7 so that the arrangement is fully sealed with respect to the environment. The duct flanges 10 and 11 by which by duct portions are interconnected are completely separate and independent of the clamping structure for the circumferential areas or edges 12 of the metal fiber filter elements 1 and 2. The clamping and mounting of the filter elements is achieved in the following manner:

On the upstream side 9 of the frame 8 on which the edges 12 of the filter elements 1 and 2 are supported there is disposed on top of the elements a movable circumferential clamping frame 13 which may be mounted onto the upstream side 9 by means of bolts 14. The clamping frame 13 has welded to its downstream side 18 a U-shaped frame component 17 which has parallel legs 15 and 16 projecting therefrom in downstream direction, that is, in the flow direction as indicated by arrow 4 so as to form two parallel edge seals 24, 25. Upon mounting of the clamping frame 13 by means of the bolts 14 the edges 12 of the elements 1 and 2 are firmly compressed between the upstream side 9 of the frame 8 and the two legs 15 and 16 of the clamping frame 13. In this manner the elements 1 and 2 are sealingly supported in the channel 3 such that any leakage along the clamped seal edges of the fiber filter elements, that is, through the edge seals 24 and 25 of the legs 15 and 16, remains without impact since such leakage flow is still contained by the duct walls 7 and remains within the channel 3.

In order to insure even compression of the filter element edges by the legs 15 and 16 there is provided a stop collar structure 19 which is welded onto the clamping frame 13 at its outer circumference such that the clamping bolts 14 are disposed between the stop collar structure 19 and the U-shaped frame component 17. The stop collar structure 19 also abuts the upstream side 9 of the frame thereby providing for good clamping results of the arrangement.

Between the two metal fiber filter elements 1 and 2 the duct wall 7 is provided with a discharge nozzle 20 through which liquid possibily precipitated from the gas stream can be removed downwardly.

In the direction 4 of the flow, just behind the filter elements 1 and 2 the frames 8 carry perforated support plates 21 which are welded to the frames 8 flush with the upstream sides 9 thereof. On the upstream sides of the steel fiber filter elements 1 and 2 there are provided stainless steel wire lattice structures 22 which, following the surface shape of the elements, retain and protect the filter elements and whose edges 23 are also clamped in under the legs 15 and 16 of the clamping structure. It may finally be pointed out that the flow direction as indicated by arrow 4 is the preferred direction but a switchover is possible so that the perforated support plates 21 are disposed upstream and the steel wire lattice structures are disposed on the downstream side of the filter elements 1 and 2.

LIST OF REFERENCE NUMERALS

1 Filter element - first stage
2 Filter element - second stage
3 Pressure relief channel
4 Flow direction arrow
5 Inlet opening
6 Perforated plate
7 Duct wall
8 Angle iron frame
9 Upstream side of collar
10 Duct flange
11 Duct flange
12 Edges of fiber filter elements
13 Clamping frame
14 Bolt
15 Leg
16 Leg
17 Frame component
18 Downstream side
19 Stop collar structure
20 Discharge nozzle
21 Perforated support plate
22 Wire lattice structure
23 Edges of lattice structure
24 Edge seal
25 Edge seal

What is claimed is:

1. A clamping arrangement for stainless steel fiber filter elements disposed on channels of pressure relief systems of safety containments of nuclear installations having ducts with walls defining said channels, said arrangement including a support frame extending around the inner surface of said duct walls and providing an inwardly projecting collar having a side surface normal to said duct walls and forming a support surface, a stainless steel fiber filter element extending across said support frame and having a peripheral area disposed on said support surface, a circumferential clamping structure engaging the stainless steel fiber filter element at its peripheral area, and including a clamping frame disposed over said support surface and bolted to said support frame, said clamping frame including a U-shaped frame component having legs projecting toward said support surface into firm engagement with the peripheral area of said filter element and a stop collar extending around said clamping frame in abutment with said support surface, and having a width adapted to provide for firm predetermined compression of said filter element peripheral area by the legs of said U-shaped frame component in series-parallel seal relationship, wherein the circumferentially outer ends of the filter elements are enclosed within the duct walls such that any leakage around the filter element edge is contained within said channel.

2. A clamping arrangement according to claim 1, wherein a perforated support plate is welded to each of said support frames essentially flush with the support surface thereof and the stainless steel fiber filter element is disposed on said perforated support plate to provide support for forces generated by gas flowing through said channel and wherein a stainless steel wire lattice structure is disposed on the top of said stainless steel fiber filter element opposite said perforated plate, said lattice structure being curved so as to follow the surface shape of said filter element and having its circumferential edges also clamped under the legs of the clamping structure so as to retain and protect the stainless steel fiber filter elements on said perforated support plate.

3. A clamping arrangement according to claim 2, wherein the curved side of said metal fiber filter element is the upstream side such that forces generated by gas passing through said filter element are taken up by said perforated plate.

* * * * *